R. W. EDWARDS.
EGG BEATER.
APPLICATION FILED FEB. 6, 1909.
930,364.
Patented Aug. 10, 1909.
2 SHEETS—SHEET 1.
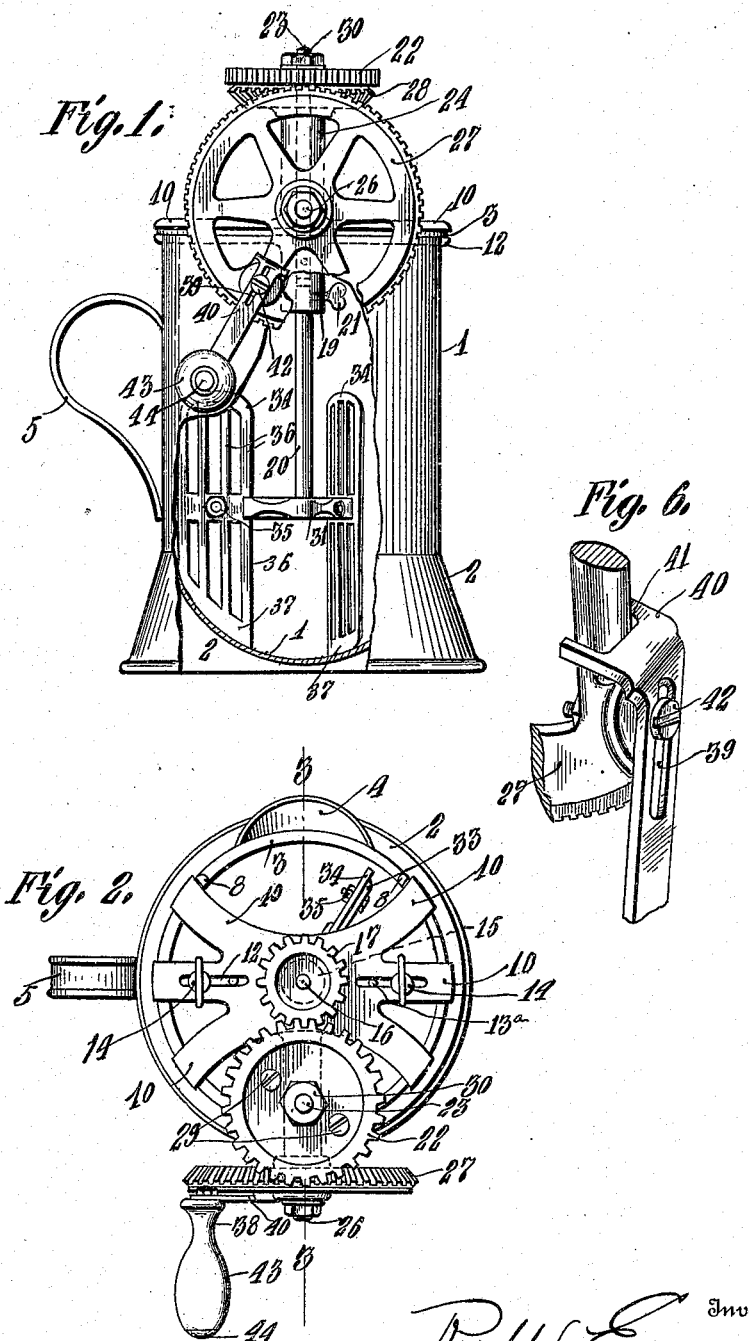
Witnesses
Morris Lessin
E. M. Ricketts
Inventor
R. W. Edwards
By Watson E. Coleman
Attorney R. W. EDWARDS.
EGG BEATER.
APPLICATION FILED FEB. 6, 1909.
930,364.
Patented Aug. 10, 1909.
2 SHEETS—SHEET 2.
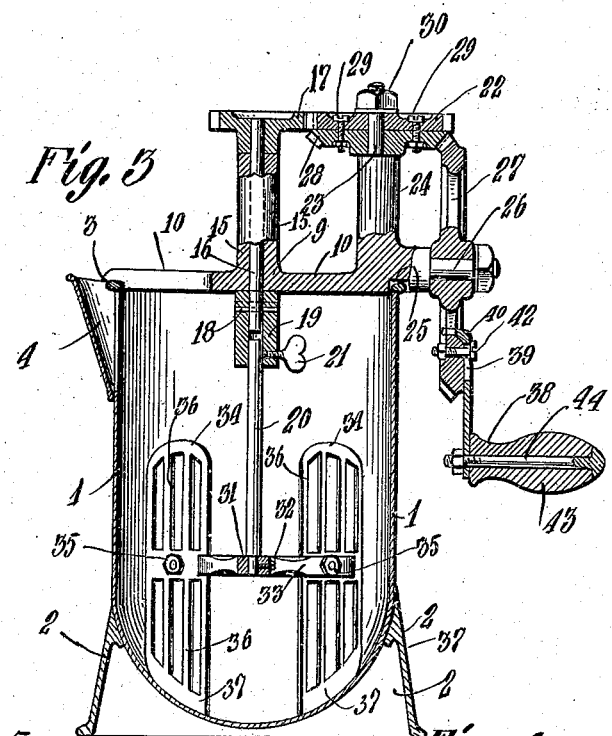
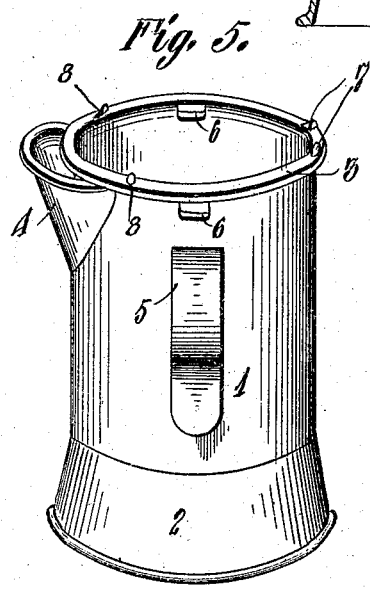
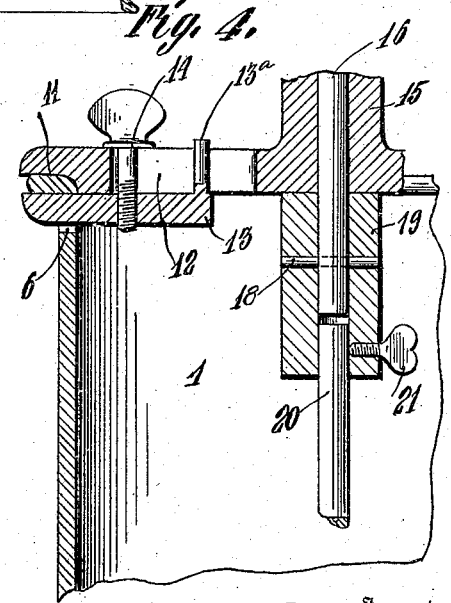

UNITED STATES PATENT OFFICE.

RUSSELL W. EDWARDS, OF WILLIAMSPORT, PENNSYLVANIA.

EGG-BEATER.

No. 930,364.        Specification of Letters Patent.        Patented Aug. 10, 1909.

Application filed February 6, 1909. Serial No. 476,564.

*To all whom it may concern:*

Be it known that I, RUSSELL W. EDWARDS, a citizen of the United States, residing at Williamsport, in the county of Lycoming and State of Pennsylvania, have invented certain new and useful Improvements in Egg-Beaters, of which the following is a specification, reference being had to the accompanying drawings.

This invention relates to improvements in devices for beating eggs, whipping cream and all kinds of icings and also for mixing dough or the like for cake and pastry.

The object of the invention is to provide a simple and practical device of this character which may be conveniently used for a variety of purposes and which will be strong and durable and easy to take apart and clean.

With the above and other objects in view, the invention consists of the novel features of construction and the combination and arrangement of parts hereinafter fully described and claimed, and illustrated in the accompanying drawings, in which—

Figure 1 is a side elevation of the improved egg beater, parts being broken away and in section; Fig. 2 is a top plan view; Fig. 3 is a vertical section taken on the plane indicated by the line 3—3 in Fig. 2; Fig. 4 is an enlarged detail section through one of the clamping devices; Fig. 5 is a detail perspective of the body or can; and Fig. 6 is a sectional perspective showing the means for adjusting the crank handle.

Referring more particularly to the drawings, 1 denotes a body or receptacle adapted to receive the eggs, cream, dough or other material to be beaten or whipped, the same being preferably in the form of a cylindrical can having an outwardly flared and rounded bottom portion 2 and an open top surrounded by a reinforcing rim or bead 3. At one point upon the top of the body 1 is a spout 4 which permits its contents to be readily poured out and upon one side of the body, in a plane at right angles to the radial plane of said spout is a suitable loop 5 which forms a handle. Formed at diametrically opposite points in the side wall of the body 1 adjacent to its rim 3 are slots or openings 6 and formed integral with the rim 3 at a point diametrically opposite the spout 4 are two upwardly projecting spaced lugs 7. Similar lugs 8 are formed on the rim 3 at points on opposite sides of and adjacent to the spout 4.

9 denotes a dasher support and bearing detachably arranged upon the open top of the body or can 1 and preferably in the form of a casting. This support or casting 9 has its base portion formed at one end with a plurality of substantially radial arms 10, the outer portions of the bottom edges of which are recessed, as shown at 11, to receive the rim or edge 3 of the body 1 and thereby center the casting upon the body. One of said arms 10 enters between the spaced lugs 7 and two other of said arms engage the lugs 8 so as to prevent the casting from turning upon the body. To removably secure the casting upon the body, two of the arms 10 are formed with longitudinally extending vertical slots 12 to form guides for radially slidable jaw plates 13, the outer ends of which are adapted to project through the openings 6 in the can, as shown more clearly in Fig. 4 of the drawings. Each of the jaw plates 13 carries at its inner end an upwardly projecting pin 13ª, which slides in the slot 12, and the intermediate portion of said jaw plate is formed with a threaded opening to receive a set screw 14, which latter also extends through the slot 12 and has a shouldered upper end shaped to provide a finger piece. It will be seen that when the screw 14 is loosened, the jaw 13 may be slid radially into and out of the slot or opening 6 and when the screw is tightened said jaw plate will be held in either of its adjusted positions. It will be noted that this construction provides an exceedingly simple and practical means for detachably securing the dasher support or casting 9 upon the body.

The support or casting 9 is formed at its center with an upwardly projecting tubular standard 15 which forms a bearing for a vertical shaft 16. The latter has fixed to its upper end a pinion 17 and to its lower end is fixed, by means of a cross pin 18, a cylindrical sleeve 19 which forms a socket for the shaft 20 of a rotary dasher. Said dasher shaft is removably secured in the lower end of the socket or sleeve 19 by a set screw 21, as clearly shown in Figs. 3 and 4. The pinion 17 meshes with a horizontally disposed gear 22 rotatable upon the reduced upper end 23 of a standard 24 formed integral with one of the radially extending arms 10 of the casting 9. This last mentioned arm projects beyond the side wall of the body and is formed in its bottom with a recess 25 to receive the rim 3 and upon its projecting outer end with a reduced portion 26 to provide a pivot for a beveled gear or similar rotary element 27. This gear 27 meshes with a beveled pinion 28 which is rotatable upon the reduced upper end 23 of the standard 24 and is secured to the bottom of the gear 22 by bolts 29, as shown more clearly in Fig. 3. The extremities of the journals 23, 26 are screw threaded to receive nuts 30, which latter retain their gears upon them.

The rotary dasher comprises a spider having an apertured hub portion 31 to receive the reduced lower end of the dasher shaft 20 and adapted to be secured thereon by a set screw 32. Said spider is also provided with radially projecting arms 33, each of which has one of its faces recessed and undercut to receive a blade 34 held in position by a bolt 35. The dasher blades 34 are in the form of vertically disposed plates provided with parallel vertical slots 36 and having their lower and outer corners rounded, as shown at 37. This form of dasher blade has been found to be highly efficient for use in the body 1 for beating eggs, whipping cream, stirring or mixing dough and the like.

A crank handle 38 is provided upon the gear 27 for the purpose of rotating the same. This handle is preferably made adjustable by constructing it from a metal strap and forming its inner end with a longitudinal slot 39 and with a right angularly bent portion 40, which latter is forked or bifurcated, as shown at 41, to straddle one of the spokes of the gear or element 27. A clamping bolt, set screw, or the like 42 extends through the slot 39 and the spoke or rim of the gear for the purpose of clamping the crank handle in adjusted position. On the outer end of the crank 38 is provided a hand grip 43 which is secured by means of a bolt 44.

Having described the invention what is claimed is:

1. A device of the character described comprising a body formed adjacent its upper edge with openings, a support removably arranged upon the top of the body and provided with arms having their outer portions recessed to receive the edge of the body, certain of said arms being formed with slots, jaw plates arranged beneath the slotted arms and adapted to be projected into the openings in the body, upwardly projecting guide pins on said jaw plates to enter and slide in said slots, clamping screws extending through the slots in said arms and into the jaw plates to secure the latter in adjusted position, a dasher carried by and depending from said support, and means upon said support for operating the dasher.

2. A device of the character described comprising a body formed with an open top and with openings adjacent to its upper edge, a dasher support arranged upon the top of the body and having arms to rest thereon, a central tubular upright bearing, a vertical bearing standard, and an outwardly projecting horizontally disposed bearing, slidable jaws upon said arms to enter the openings in the body, a shaft in said tubular bearing, a coupling upon the lower end of said shaft, a dasher having its shaft removably secured in the coupling, a pinion upon the upper end of the shaft, a gear in mesh with said pinion and journaled upon said vertical bearing standard, a beveled pinion secured to the bottom of said gear, a beveled gear journaled upon said horizontal bearing arm, a crank and means whereby the crank may be adjusted radially on said beveled gear.

3. A device of the character described comprising a body having an open top and a reinforcing rim around its upper end formed at intervals with upwardly projecting lugs, the side wall of said body being formed with openings, a dasher support having arms recessed at their outer ends to receive the rim of the body and to enter between and engage said lugs, slidable jaws on said arms to enter the openings in the body, means for clamping said jaws in adjusted position, a dasher carried by said support and means on said support for rotating the dasher.

In testimony whereof I hereunto affix my signature in the presence of two witnesses.

RUSSELL W. EDWARDS.

Witnesses:
  LEWIS C. HARINTON,
  SAMUEL E. SHAFFER.